Patented Oct. 15, 1940

2,217,667

UNITED STATES PATENT OFFICE 2,217,667

BISTHIOAMMELINE POLYALKYLENE ETHER RESIN

Herman A. Bruson and James L. Rainey, Philadelphia, Pa., assignors to The Resinous Products & Chemical Company, Philadelphia, Pa.

No Drawing. Application September 30, 1939, Serial No. 297,280

22 Claims. (Cl. 260—72)

This invention relates to new addition products and condensates of aldehydes and bisthioammeline polyalkylene ethers. It further relates to polymeric and resinous forms of such condensates and to joint polymers of these with related resinous materials.

Utilization of condensates of thioammeline has been handicapped by their instability and the subsequent difficulties encountered with their practical application. It is now found that interesting, useful condensates and plastic products can be obtained from certain thioammeline ethers and that these possess marked improvements over plastic materials previously available.

An object of this invention is the preparation of useful addition products, condensates, and resins based on bisthioammeline polyalkylene ethers. It is also an object to prepare resins of superior resistance to light, heat, and water. It is a further object to make available a new type of condensate which may be adapted for use in any of the various fields of application of plastics, such as casting, molding, binding, coating, or impregnating. It is also an object to produce a condensate which may be compounded with other materials, such as fillers, plasticizers, pigments, dyes, etc. and which may be mixed with other resinous materials with advantage. It is a further object to make available co-condensates of bisthioammeline polyalkylene ethers and other resin-forming materials.

The attainment of these objects is based fundamentally upon the reaction of an aldehyde with the bisthioammeline polyalkylene ethers described in co-pending application Serial No. 283,808, filed July 11, 1939. These bisthioammeline polyalkylene ethers have the general formula

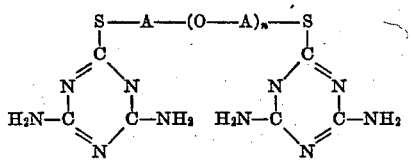

wherein A represents a lower alkylene group having at least two carbon atoms and $n$ represents a small integer, preferably from one to five. A may be such a group as —CH$_2$CH$_2$—, —CH$_2$CH$_2$CH$_2$—,
—CH$_2$CH(CH$_3$)—, —CH$_2$CH$_2$CH$_2$CH$_2$— etc.

The aldehyde most commonly used is formaldehyde in aqueous or organic solvent solution or in the form of a solid polymer such as paraformaldehyde. There may also be used other aldehydes, such as acetaldehyde, butyraldehyde, benzaldehyde, furfuraldehyde, homologues of such aldehydes, etc., or mixtures of various aldehydes, when special properties are desirable. In part there may also be used, as a source of formaldehyde, hexamethylene tetramine, methylol urea, or dimethylolurea. A small amount of hexamethylene tetramine (up to 4%) may be used with other aldehydes, for example, to maintain neutrality in the reacting mixture.

In general the bisthioammeline polyalkylene ether is added in powder form to an aldehyde solution and the formation of the addition product of ether and aldehyde hastened by warming or heating. The thioammeline ether dissolves under these conditions. The solution may be stabilized by the addition of a little alcohol. It is noteworthy that under the proper conditions alcohols can enter very easily into combination with the fundamental addition reaction product and etherification is so rapid that no precipitate results in this reaction. The addition product can be modified in various ways and can be advanced to various stages of condensation and polymerization, as will be shown below.

The bisthioammeline polyalkylene ether and aldehyde may be reacted over a wide range of conditions as to catalyst, pH, presence of salts or buffers, temperature, pressure, solvents, ratio of reactants, etc. In the simplest procedure with aqueous formaldehyde no catalyst is added to prepare a primary addition product, for, as is known, commercial formaldehyde contains enough formic acid to render it definitely acidic and cause a relatively rapid reaction. On the other hand, most of the ethers react with aldehydes in a preferred and particularly satisfactory manner in a medium having a pH within the range of 6 to 8. For practical purposes this range of pH may be regarded as essentially neutral. This condition may be obtained by adding to a normally acid solution of reactants an alkaline material, such as ammonia, amines, hexamethylene tetramine, sodium or potassium hydroxide, or carbonate, barium hydroxide, magnesium hydroxide, lime, etc. or a potentially alkaline or neutralizing material, such as magnesium or calcium carbonate, sodium bicarbonate, or activated carbon. When the reaction medium becomes definitely alkaline, the addition products may be obtained with little further condensation, which takes place so readily in acid solution. In case it is desired to overcome alkalinity, any acid may be used. When the methylol compound is once formed, condensation and polymerization may be obtained under definitely acidic conditions. When acids, such as formic, acetic, oxalic, citric, lactic, etc., are added to the primary addition product, the effect is to shorten the condensation time and/or advance the stage of condensation.

In order to hold the pH at any desired level there may be added buffers or salts. If any appreciable concentration of salts is added, there is a noticeable effect on the character of the polymer which results. Apparently, the alkaline earth salts, such as calcium chloride, in concentrations of 2 to 20% based on the weight of thioammeline ether or the combined weight of such ether and other methylol-forming compound, form some type of compound with the condensate which imparts stability to such resin solutions, lessens their tendency to gel, and improves the bonding strength of the resin formed from these solutions. Other salts, such as zinc chloride, and the neutral alkali salts, such as sodium sulfate, behave somewhat like the alkaline earth salts. On the other hand, potentially acid salts, like aluminum sulfate, become catalysts in the hardening process under the influence of heat.

While the bisthioammeline polyalkylene ethers and aldehydes are commonly reacted in aqueous solution, they may also be reacted in the presence of organic solvents. Also, condensation which has been initiated in aqueous solution may be continued in organic solvent solution. Of particular interest as solvents are the alcohols which act not only as solvents but also as components in the condensation. Monohydric alcohols, for example butyl alcohol, in an acidic medium readily give etherification. While from one to three per cent. of an organic acid, such as formic, phthalic, or oxalic, will normally promote this reaction successfully, it is possible under carefully controlled conditions to use even 10% of an acid, such as formic, to catalyze this reaction. If inorganic acids replace the organic, smaller amounts of catalyst are necessary. Thus, 0.1% of hydrochloric acid or phosphoric acid is sufficient to promote the condensation with an alcohol. The reaction becomes slower as the molecular size of the alcohol increases. When it is desired to introduce large groups from the alcohol, it is generally more expeditious to obtain etherification first with an alcohol of low molecular weight and then to replace it by boiling the resin solution with an alcohol of higher molecular weight.

Condensation of the bisthioammeline polyalkylene ethers and aldehydes may also be effected in the presence of polyhydric alcohols, such as glycols, glycerine, sorbitol, glucose, mannitol, dextrose, etc. In fact, mixed-type molecules containing free hydroxyl groups, such as monoethers or monoesters of the polyhydric alcohols, or chlorinated alcohol-type (i. e., hydroxyl-containing) solvents, such as the chlorohydrins, give definite indications of forming reaction products even in absence of a catalyst. In condensing the bisthioammeline polyalkylene ethers, aldehydes, and polyhydric alcohols, it is possible to control the extent of etherification by the use of acid catalysts as in the case of monohydric alcohols described above.

In reacting with the hydroxyl-bearing compounds it is sometimes advisable to remove water as it is formed. This may be done in a simple fashion by the use of a water trap, or with desiccating reagents, such as calcium sulfate, prepared as soluble anhydrite, activated alumina, magnesium perchlorate, calcium chloride, etc. for example, in the reflux or condenser system. On the other hand with methyl or ethyl alcohol it is possible to obtain some etherification without removal of water. Condensation with ethyl alcohol with removal of water of reaction can be accomplished by utilizing an azeotropic mixture (benzene-alcohol-water) and a column to effect water separation.

The addition and condensation reaction of a bisthioammeline polyalkylene ether and aldehyde is performed in a short time between 60° C. and 100° C. under conditions of atmospheric pressure. Higher pressures may be used, if desired, with shortening of reaction time, and, when formaldehyde is used, without loss of formaldehyde. Since the reaction takes place readily in most cases in a reasonably short time, elaborate apparatus is not required.

The bisthioammeline polyalkylene ethers possess a feature of particular importance in that each molecule presents four reactive amino groups and it is theoretically possible, for example, to form eight methylol groups by addition of formaldehyde. Experiment has shown that between ratios of one molecular proportion of a bisthioammeline polyalkylene ether to four proportions of aldehyde and one molecular proportion of a bisthioammeline polyalkylene ether to eight molecular proportions of aldehyde useful addition products and condensates may be obtained. When too little aldehyde is used, the reactive condensates tend to be unstable; when more aldehyde than corresponds with the 1:8 ratio is used, there may be a loss in water-resistance of resins made therefrom and in extreme cases curing is unsatisfactory.

In general, however, it is desirable to carry out the initial reaction with at least six mols of aldehyde, as it is thus rendered smoother and easier to perform. Also, the product obtained is more stable and more uniform. If excess of formaldehyde or other aldehyde is left in the reaction product, less harm is done in the case of the bisthioammeline polyalkylene ether condensates than with such resin-forming materials as urea-formaldehyde or phenol-formaldehyde. Yet, in forming the final product it is advisable to eliminate excess aldehyde to obtain maximum water-resistance for the final resinous product formed and to provide optimum conditions for curing. This may be accomplished by adding to the reaction mixture following the initial reaction more of a thioammeline ether, or urea, thiourea, dicyandiamide, aniline, primary or secondary amines, amides of mono- or polycarboxylic acids, sulfonamide, phenol or other compound which reacts with formaldehyde to form a methylol derivative, so-called methylol-forming compounds. In effect, these materials form in this way a type of co-condensed resin.

As another way of forming co-condensates one may start with an excess of formaldehyde with urea or other carbamide and react the excess formaldehyde with a bisthioammeline polyalkylene ether.

A still further way, and a preferred way, of obtaining co-condensates is to mix a methylol-forming compound such as urea with a bisthioammeline polyalkylene ether and then react with an aldehyde. For example, one mol of $\beta,\beta'$-bisthioammeline diethyl ether, one mol of urea and six mols of formaldehyde in aqueous solution at pH 7 to 9 were heated at 60 to 90° C. to yield a mixed condensate of particular value, in which the good features of the bisthioammeline polyalkylene ether predominated. Likewise, the thioammeline ethers may be condensed with other methylol-forming triazines, such as melamine and its derivatives, or with the pyrimidines, resulting in better conditions of reaction, behavior and properties of the condensates and resins, and quality of the final product then would have been obtained with the latter compounds alone.

By any of these procedures there are obtained co-condensed resins. A comparable result may be achieved by mixing a separately prepared aldehyde condensate of a methylol-forming compound with the bisthioammeline polyalkylene ether-aldehyde condensate and completing the condensation and polymerization of the mixed products. As examples of the wide choice of other resinous materials which may be incorporated with the thioammeline ether-aldehyde condensates there may be mentioned the soluble, intermediate condensates of the following types: Urea-formaldehyde, phenol-formaldehyde, aniline-formaldehyde, sulfonamide-aldehyde, furfural resins, and alkyd resins. Some of these may be mixed in the aqueous stage, others only in the alcohol systems (as the alkyd resins), and some in either stage. The alkyds may be used, for example, to impart added flexibility and the sulfonamide resins to increase gloss. Since at the present time all of these other resinous materials may be prepared more cheaply than the thioammeline ethers, their mixtures with thioammeline ether-aldehyde condensates provide economy and, yet, the advantages of the thioammeline ether resins are to an important degree enjoyed in the resulting composite resin.

While the improved properties due to the bisthioammeline polyalkylene ether-aldehyde resins are imparted to co-condensed or mixed resins even more than would be expected from the ratio of the new resins to the other resinous materials, it has been found that in general the mixtures which contain at least one part of bisthioammeline polyalkylene ether-aldehyde reaction products to one part of other resinous materials are unusually valuable for their stability, resistance to water, low water absorption, resistance to light, latitude in curing conditions, improved flow in molding, etc. The ratio may, however, be carried to 1:3 with satisfactory results.

The new condensates and co-condensates may be modified by the addition of non-resinous materials, such as fillers, plasticizers, and coloring agents. For fillers, as in the preparation of molding powders, there may be used such materials as wood flour, cotton linters, alpha cellulose floc, starch, asbestos, chalk, clay, barytes, infusorial earth, etc. Plasticizers which may be used include the alkyd-type resins, particularly those modified with oils or fatty acids and the adipic or sebacic acid-polyhydric alcohol condensates, dibutyl sebacate, dibutyl phthalate, diethoxydiethyl phthalate, the condensates of carboxylic acids and nitro-aliphatic alcohols as disclosed in application Serial No. 248,195 filed December 29, 1938, etc. As coloring agents there may be used pigments, lakes, or dyes. Coloring materials sensitive to sulfur or thiourea are unaffected by the new resinous materials. Interesting effects may be obtained by incorporating metal powders or pearlescent materials. These various modifications are suggestive of the many forms and variations which are obtainable with resinous or plastic compositions based on the bisthioammeline polyalkylene ethers.

The following examples are illustrative of the preparation of addition and condensation products.

*Example 1*

A mixture of 7.1 parts of $\beta,\beta'$-bisthioammeline diethyl ether

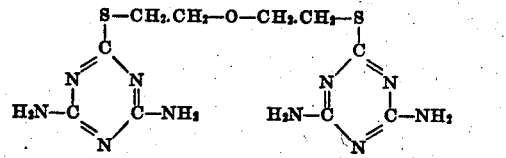

and 12.9 parts of 37% aqueous formaldehyde adjusted to a pH of 7 with soda ash was heated to 80° C. for one-half hour. When the solution became clear, 2 parts of ethyl alcohol was added. The resulting solution, containing 45% solids, had a pH of 5.8 and was stable over a long period of time.

*Example 2*

The following mixture was reacted at 82° C. for 13 minutes:

|  | Grams |
|---|---|
| $\beta,\beta'$-bisthioammeline diethyl ether | 35.6 |
| 37% aqueous formaldehyde | 64.8 |
| Ethyl alcohol | 5 |
| Water | 10 |
| A 10% solution of soda ash | 0.8 |

At the end of 13 minutes, the mixture became clear. After the solution was adjusted to a pH of 7.0 with 0.5 g. of 10% soda ash solution, it was heated at 70° C. for 15 minutes. It was then cooled and an oily layer separated, from which crystals finally formed on standing. The yield varied in different experiments between 42 and 45 g. of crystals of polymethylol derivative.

These crystals can be readily dissolved in an equal weight of solvent, consisting of 3 parts of acetone and 1 part of water. Such a solution may be employed as a convenient form of potential resin, particularly where excellent penetration is desired, as in reinforced wood, crush-resistant textiles, translucent laminations and molding powders, etc. It may also be mixed with thickeners, such as starch and flour, or in some cases used alone, to serve as an adhesive, in which case it is advisable to add the usual acidic catalysts to accelerate the hardening reaction at room or elevated temperatures. The water-resistance can be improved by adding a reagent such as 4 g. of urea per 30 g. of crystals to reduce the ratio of formaldehyde to nitrogen in the original compound.

*Example 3*

|  | Parts |
|---|---|
| $\beta,\beta'$-bis-thioammeline diethyl ether | 35.6 |
| Aqueous formaldehyde | 64.8 |
| Ethyl alcohol | 5 |
| Water | 10 |

This mixture was heated at 83° C. with stirring until the resulting solution became clear, thirteen minutes being required for this step of the procedure. Heating was continued at 80° C. until the reaction mixture became turbid (30 minutes). Then 100 parts of water was added. The mixture was cooled and neutralized to a pH of 7.0 with sodium carbonate. The resulting layers were separated. The lower, oily layer was washed once with 50 parts of water and the washed oil dissolved in 40 parts of ethyl alcohol. 6 parts of urea were then added and quickly dissolved.

The product was a clear solution having a solids content of 43% and a viscosity of 265 Saybolt seconds at 25° C., and a pH of 5.5. It was found useful as an impregnating solution for paper and wood.

Example 4

The following materials were combined in a reaction vessel equipped with a stirrer:

| | Parts |
|---|---|
| β,β'-bis-thioammeline diethyl ether | 142 |
| 37% formaldehyde in ethyl alcohol | 191 |
| Ethyl alcohol (denatured) | 500 |

This mixture was heated under reflux for 4 hours and a clear solution formed, with, however, some resinous material collecting on the walls of the reaction vessel. The solution was filtered and the clear filtrate (570 parts) was concentrated to a 35% solids content by distillation. It was useful both as an impregnating solution and as an adhesive.

Example 5

486 parts of a 37% aqueous solution of formaldehyde (6 molar proportions) was heated to 85° C. Over a period of about five minutes 356 parts of β,β'-bis-thioammeline diethyl ether was added with good stirring to the formaldehyde solution and the mixture was maintained at 85° C. until the thioammeline ether was completely dissolved. The pH of the resulting solution was then adjusted to a pH between 6 and 7 by the addition of small amounts of soda ash solution or formic acid. The solution was strained to remove any solid particles which might be present and allowed to cool. Crystals formed. They were broken up, washed with water, filtered, and dried at about 40° C. It is preferable to dry such crystals at relatively low temperatures.

The solid material obtained corresponded approximately to the hexamethylol derivative. The yields in a series of preparations by the above procedure became as high as 95% with practice in manipulation. The crystals were soluble in hot water, alcohol, dioxane, the monoethyl ether of ethylene glycol, the monoethyl ether of diethylene glycol, etc. The crystals reacted readily with alcohols to form stable solutions.

Example 6

486 parts of 37% aqueous formaldehyde was heated to 85° C. and 356 parts of powdered β,β'-bis-thioammeline diethyl ether gradually added over a period of about five minutes. The mixture was heated until the powdered material was practically all dissolved. The pH of the solution was then adjusted to between 6 and 7. Heating was continued at 85 to 90° C. until there was a separation of two liquid phases. At this time the solution was subjected to a vacuum and 180 parts of water was removed while the temperature of the liquids was maintained between 40 and 60° C. The water was replaced with ethyl alcohol in order to maintain a stable solution. The final solution, constituting 750 parts, had a solids content of 56% and a pH of 7.6. It was particularly useful as an impregnating solution and as an adhesive.

Example 7

Two molecular proportions (60 parts) of paraformaldehyde were dissolved in two molecular proportions (148 parts) of normal butanol. One-fourth molecular proportion (89 parts) of powdered β,β'-bis-thioammeline diethyl ether was added to the alcohol solution at room temperature. The mixture was then stirred and heated to 105° C., and the temperature maintained for 5 to 10 minutes. Four parts of 50% aqueous formic acid were then added along with nine parts of xylol. Vigorous refluxing followed, during which the water was separated in a water trap and the alcohol returned to the reaction vessel. After being heated for two hours, the reaction mixture yielded one molecular proportion of water (18 parts) and the splitting out of water ceased. The temperature at this point had reached 120° C. Upon filtration, 245 parts of a very pale yellow, water-clear resin solution was obtained, containing 51% solids and possessing at 25° C. a viscosity of H on the Gardner-Holdt scale. The solution had a mineral thinner tolerance of 11 ml. for 10 grams of resin solution. This solution was particularly effective for coatings.

Example 8

There were reacted 8 parts of the bisthioammeline polyalkylene ether, obtained by reacting two molecular proportions of thioammeline and one of dichlorotriethylene glycol and having the formula

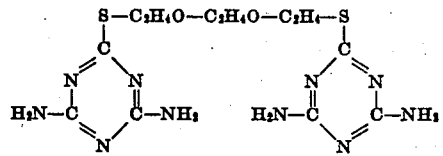

and 13 parts of an aqueous 37% formaldehyde solution to which there had been added previously 0.2 parts of a 10% aqueous solution of sodium carbonate to bring the solution to neutrality. The mixture was stirred and heated to 85° C. After about 20 minutes the solution became clear. Heating was continued at 85° C. until a sample of the solution became cloudy on cooling to 75° C. The reaction mixture was then cooled and 20 parts of water added. An oily layer thereupon formed which was separated, washed with a little water, and then diluted with 8 parts of denatured alcohol to give a clear, pale yellow solution of 44% solids, with a pH of 7, and having a viscosity of A— on the Gardner-Holdt scale. Part of the solution was stored for a month at 40° C. for an accelerated ageing test. Its stability was shown by the homogeneity maintained.

Substitution of the reaction product from thioammeline and dibromtetraethylene glycol for the above bisthioammeline diether leads to the formation of addition and condensation products and of resins which closely resemble the derivatives of the above compound.

Example 9

A resin, suitable for use as an adhesive, was prepared by neutralizing 243 parts by weight of an aqueous 37% formaldehyde solution with lime until a pH of 7.2 was reached, heating the neutralized solution to 85° C., stirring in 178 parts of powdered bis-thioammeline diethyl ether over a period of about 10 minutes, and then adding 3.25 parts of calcium chloride. The temperature was maintained between 85 and 90° C. until a critical solution temperature of 90° C. was reached, i. e., 90° C. was the lowest temperature at which the solution remained clear. The solution was then subjected to vacuum and 140 parts of water was distilled off at pressures between 100 and 20 mm. The residual mass was a thick paste which was taken up in 127 parts of ethyl alcohol to yield a homogeneous viscous solution of 66.7% solids and a viscosity of Z on the Gardner-Holdt scale.

In place of lime in the above example there may be used sodium hydroxide, or soda ash, with entirely satisfactory results, or the solution may be treated with activated charcoal. In place of calcium chloride there may be used zinc chloride, magnesium chloride or barium chloride, likewise with satisfactory results. The above resinous solution may be further modified with extenders, fillers, etc.

The products obtained by the foregoing processes are either addition products of a bisthioammeline polyalkylene ether and an aldehyde or condensation products thereof, in the formation of which water is eliminated. The various addition products or condensates produced as in the above examples may be further condensed or polymerized and hardened under the influence of heat. Conversion to advanced stages of condensation and polymerization may be accelerated by the use of an acidic catalyst. Organic acids, such as tartaric, lactic, citric, maleic, oxalic, or phthalic (in the form of its anhydride), acid salts, such as the hydrochloric acid salts of the methylamines, ammonium acid phosphate, sodium acid sulfate, etc. potentially acid compounds such as ammonium thiocyanate, barium ethyl sulfate, ammonium chloride, ammonium sulfate, alum, etc. are among the practical and useful catalysts which may be here employed and as a class are designated acidic catalysts.

The condensates may be hardened or cured in a number of ways and forms. For example, syrups may be prepared, treated with an acid catalyst, and cast in forms. Even liquid acids, such as acetic or lactic acid, may be used as catalysts under these conditions. Again, the solutions, syrups, or oils may be used to saturate fillers, which are then dried at temperatures below those required for hardening. The dried products may then be ground for use as molding powders and, if desired, other materials may be added at this point, such as release agents and mold lubricants (metallic soaps, like zinc stearate, being examples), additional filler, other resinous materials, coloring material, catalyst, etc.

In another type of application fibrous sheets may be impregnated with solution, excess solvent removed and several of the treated sheets subjected to heat and pressure to produce a composite laminated material. Temperatures for curing may be varied from 125° C. to 165° C. with times of curing varying from 60 minutes to 10 minutes. Pressures of a few hundred pounds up to several thousand pounds per square inch may be used. It is an outstanding feature of the pure resins or the mixed resins from the bisthioammeline polyalkylene ethers that conditions of curing are not so critical as with urea-formaldehyde resin. For example, temperatures up to 165° C. may be used in curing the new resins whereas urea-formaldehyde begins to scorch at 140–145° C. Other typical and unique properties of the new resinous materials made possible by this invention are the excellent water-resistance and light-resistance obtained in not only laminated but also molded or cast articles. Properly cured samples subjected to boiling water for a half-hour show no indications of spotting, marking or becoming dull, and their water-absorption is considerably lower than that commonly observed with the best commercial urea-formaldehyde plastics. Ultra-violet light does not cause such articles to become yellow whereas resins made with other sulfur compounds such as thiourea turn yellow when exposed to sunlight.

As a specific instance of a composite laminated material produced with the thioammeline ether resins, a resin solution prepared according to Example 2 was used to impregnate an absorbent paper. The solvent was removed by drying the paper in an oven at 100° C. Five sheets of the impregnated and dried paper were piled together in a press and subjected to 1400 lbs. per square inch pressure for 10 minutes at 165° C. Another five sheets were pressed at 1400 lbs. per square inch for 35 minutes at 130° C. The laminations in both cases were without color, water-resistant and chemical-resistant. A 30% solution of hydrogen peroxide was without action on these panels. Boiling in water at 100° C. for 30 minutes did not injure them.

The alcoholic solution of the condensate prepared in Example 8 was used to impregnate an absorbent paper 0.003 inch thick. The impregnated paper was dried in an oven at 100° C. and contained 63.5% of the solid condensate. The dried, impregnated sheet was placed over a $\frac{1}{32}$" layer of prima vera wood, which was in turn placed on a sheet of paper impregnated with phenol-formaldehyde resin as used for laminating wood, which was in turn placed on a $\frac{1}{4}$" sheet of pressed fiber board sold under the trade name of Masonite. This assembly was subjected to 1400 lbs. per square inch pressure for 25 minutes in a steam press operating at 150° C.

The resulting laminated product had an excellent bond between fiber board and prima vera veneer. The protective sheet on the outer surface thereof was also tightly held and showed a good gloss. The surface resisted spotting when a boiling tea kettle was left on the laminated sheet for 15 minutes. A panel left in boiling water for several hours was unaffected.

Another application for the pure condensates, the co-condensates or the resin-modified condensates is in binding wood, cork, paper, cardboard, cloth, asbestos, sawdust, mineral pigments, animal, vegetable, or synthetic fibers, metal foil, glass, or other material to the same or a different material. To illustrate the value of the new materials for this use, plywood was made with an adhesive such as the solution prepared in Example 4 or such as a paste containing 100 parts of a resin solution containing 40% of the condensate from one mol of $\beta,\beta'$-bisthioammeline diethyl ether and six mols of formaldehyde, reacted at pH 6–7 for 15 minutes at 70° C., 40 parts of wheat flour, and 4 parts of an aqueous 40% ammonium thiocyanate solution. These adhesives were applied to $\frac{1}{16}$" birchwood at the rate of 13 grams per square foot and a three-ply veneer formed. Curing was done in a hydraulic press at 200° F. and 200 lbs. per square inch for 5 minutes. The plywood obtained was tested by boiling in water for eight hours. No separation resulted. This high degree of water-resistance was retained when the pastes above were diluted with an equal weight of a commercial urea-formaldehyde plywood adhesive and used for similar laminations.

In another application of a thioammeline ether resin as an adhesive, 100 parts of the methylol product obtained as in Example 5 was mixed with 100 parts of wheat flour, 100 parts of a solvent composed of 50% water and 50% alcohol, and 2.5 parts of ammonium thiocyanate (as catalyst).

The adhesive was spread on birch veneer at the rate of 0.03 pound per square foot. Three plies of birch were united under 200 lbs. per square inch pressure at a temperature of 240° F. for five minutes. The resulting plywood had a shear strength of 320 lbs. per square inch.

In forming plywood from a viscous solution, obtained as in Example 6 above, there was added to 100 parts of this viscous solution 8 parts of a 25% alcoholic ammonium thiocyanate solution. This mixture was spread on birch veneer at 0.03 pound per square foot and a three-ply veneer formed at 240° F. and a pressure of 200 lbs. per square inch for four minutes. The resulting plywood had a shear strength of 350 lbs. per square inch. A sample of this wood was boiled in water for three hours without delamination. The boiled piece still possessed a shear strength of 340 lbs. per square inch. A plywood prepared with a high-grade commercial urea-formaldehyde adhesive was delaminated in about 45 minutes under the same conditions of testing.

A viscous material, prepared as in Example 9 above, was used with ammonium thiocyanate as a catalyst for bonding plywood. A three-ply sheet of birch veneer was prepared with 12 g. of adhesive per square foot at pressures of 200 lbs. per square inch at 240° F. with curing time of 2 to 4 minutes. The shear strength of plywood formed in this way varied from 300 to 500 lbs. per square inch. Samples were boiled in water for 30 minutes without delamination, although samples prepared with typical available urea-formaldehyde adhesives were completely delaminated in this time. Samples cured for 4 minutes by the above procedure showed high shear strength (275 lbs.) even after the boiling treatment.

Another type of use for the new resins is in connection with finishing, stiffening, waterproofing, or otherwise treating fibrous material in the form of felts, webs, battings, woven or knitted fabrics, etc. Thus, paper fibers may be treated to increase wet strength and to bind fillers, and to coat, glaze, or size the sheet. Textile fabrics of cotton, linen, rayon, wool, etc. may be anticreased, made resistant to crushing, crumpling, and wear, stabilized against shrinkage, "laddering", and pulling-out of threads and seams (when made into garments), treated to increase bulk, to improve hand and draping qualities, to increase receptivity to dyes, to improve the brilliance of dyes, to deluster, to impart a permanent glaze, etc. Starch, and other polyhydroxy sizing materials, including cellulose ethers and polyvinyl alcohol, may be improved by the addition thereto of one of the new methylol addition products or condensates, followed by curing, and rendered resistant to removal by washing and mechanical working. Waterproofing materials are better retained on fabrics when the composition applied includes the new type of condensate.

As an example of rendering fabric crush-resistant, there may be cited the treatment of a 48x52, 3.85 yard, all-spun rayon fabric. This was impregnated by dipping twice into a 20% solution, made from powder prepared as in Example 5 and sufficient alcohol to yield a clear solution, and squeezing twice on a hydraulic mangle at six tons pressure. The cloth was dried at a moderate temperature in a tenter and cured in a loop drier at about 240° F. The finished fabric was full, mellow, and resilient. After it was washed in a hot solution of 0.2% soap and 0.1% soda ash, it retained over 90% of its resiliency.

Still another field of application is found in coatings. The new resinous materials may be used in varnishes, enamels, lacquers, and emulsions. The addition products or condensates may be reacted with alkyd resins or oil-modified alkyd resins or the alcohol-type condensates may be thus combined to give valuable varnishes of the drying type or baking type. Water-resistance of nitrocellulose lacquers can be substantially increased by heating bisthioammeline polyalkylene ether-aldehyde condensates with nitrocellulose, castor oil, and suitable solvents. The new condensates, which have an unusually wide range of compatibility, may also be used with cellulose ethers or with oleoresinous vehicles for coating applications.

The resinous solution obtained as in Example 7 may be employed as a coating material. It is converted to a very hard and water-resistant film on curing at a temperature between 200° F. and 300° F. As the unmodified film, thus obtained, may be brittle, it is preferable to modify this film with a plasticizer. A white enamel was made with 200 parts of titanium dioxide, 100 parts of the alcoholic solution from Example 7 and 100 parts of a castor oil-modified alkyd resin, based on phthalic anhydride and glycerol. The mixture was diluted with an aromatic solvent to a Gardner-Holdt viscosity of E and sprayed on both metal and wood. It was found that the following curing schedule gave excellent results:—

45 minutes at 225° F.
or 30 minutes at 250° F.
or 15 minutes at 300° F.

The baked films were hard, scratch-resistant, glossy, and highly resistant to water or alkali and in these respects were superior to films produced from a similar urea resin.

The following preparation is typical of mixed coating compositions. An alcoholic solution containing 3.6 parts of the resin prepared in Example 4 was mixed with one part of tricresyl phosphate and 10.8 parts of an alcoholic solution of a potentially reactive phenol-formaldehyde resin prepared from one mol of phenol and 1.25 mols of formaldehyde in the presence of ⅓ mol of ammonia. After this resin was formed, it was dehydrated at 85° C. under vacuum and taken up in denatured alcohol to yield a 50% solution. The blend was used for metal coatings which were hardened at 250° F. in an hour to give tough, light-colored, water- and solvent-resistant films.

There was added to a blend of the proportions just described 0.3 part of an acid catalyst prepared by mixing equal volumes of denatured alcohol and commercial hydrochloric acid. The acidified blend gave coatings which hardened overnight without elevated temperatures. Such solutions are suitable for wood finishing, paper coating, etc.

In place of the resinous material prepared as in Example 4, there was used material prepared as in Example 7, for the preparation of modified phenol-formaldehyde coatings. The films formed by baking or acid-curing were likewise tough, light-colored, and highly resistant to water or solvent.

There are also many miscellaneous uses for the new resins. For example, they may be cured in strongly acid solution to give a sandy or granular form which may, if desired, be stained or dyed and used as a powder, abrasive, pigment, etc. The condensates in low polymer form may be incorporated in cements or plasters. They may be mixed with maleic anhydride-terpineol condensates for the preparation of transparent or semi-transparent silk fabrics and used with pigments and cork for the manufacture of floor and wall tile, etc.

While numerous advantages of resins prepared with the bisthioammeline polyalkylene ethers have already been noted, there are some advantages which require particular mention. The molding powders, laminations, coatings, etc. all show improved flow under pressure and this is another of the valuable properties which the pure condensates impart to mixed condensates or co-condensates. Another important advantage, due to the new type of resin, is the latitude permissible in curing molded objects, plywood, laminations, etc. Since less critical conditions of time and temperature are required, the thioammeline ether resins may be applied over or in conjunction with such resins as phenol-formaldehyde, which may be critical as to curing conditions of time and temperature. The new resins possess greater compatibility with other resinous materials than does urea-formaldehyde, for example. They are more satisfactory with sensitive pigments than comparable resins and do not dull or change the color. For example, the new condensates and co-condensates may be used with cadmium selenide in an entirely satisfactory manner. These numerous advantages permit applications in many fields for an exceptionally wide variety of products.

We claim:

1. The process which comprises heating at a temperature between about 90 and about 95° C. and at a pH of from 6 to 8 an aqueous solution of $\beta,\beta'$-bis-thioammeline diethyl ether and from 6 to 8 molecular equivalents of formaldehyde, cooling said solution when condensation has reached a point at which turbidity appears when the temperature is reduced to from 70 to 80° C., reducing the water content of the cooled product by vacuum distillation, adding urea in an amount sufficient to combine with unreacted formaldehyde, diluting the product with a lower aliphatic alcohol and heating until a solution which remains clear at room temperature is formed.

2. The process of preparing a resinous condensation product which comprises heating at a temperature between about 85 and about 95° C. and at a pH of from 6 to 8 an aqueous solution containing calcium chloride, $\beta,\beta'$-bis-thioammeline diethyl ether, and approximately six molecular equivalents of formaldehyde, cooling said solution when condensation has reached a point at which turbidity begins to appear, reducing the water content of the cooled product by vacuum distillation, and diluting the product with a lower aliphatic alcohol.

3. The process which comprises forming a butanol solution of one molecular equivalent of $\beta,\beta'$-bisthioammeline diethyl ether and substantially eight molecular equivalents of formaldehyde, acidifying the solution with formic acid and heating the acidic mixture under reflux conditions which permit the separation of the water of reaction until substantially four molecular equivalents of water have been separated.

4. The process which comprises heating a substantially neutral aqueous solution of a bisthioammeline polyalkylene ether and formaldehyde until condensation has reached a point at which the solution becomes turbid on cooling, and thereafter reducing the water content of the product and dissolving it in a lower aliphatic alcohol.

5. The process claimed in claim 4 in which the bisthioammeline polyalkylene ether is $\beta,\beta'$-bisthioammeline diethyl ether.

6. The process which comprises heating together at reacting temperatures in the presence of a solvent a bisthioammeline polyalkylene ether and an aldehyde.

7. The process claimed in claim 6 in which the aldehyde is formaldehyde.

8. The process which comprises heating together at reacting temperatures under approximately neutral conditions at least one molecular proportion of a bisthioammeline polyalkylene ether and between four and eight molecular proportions of formaldehyde.

9. The process which comprises heating at reacting temperatures a substantially neutral aqueous solution of a bisthioammeline polyalkylene ether and formaldehyde at least until the formaldehyde addition product of the bisthioammeline polyalkylene ether is formed and separating the reaction product from the aqueous layer.

10. The process which comprises heating in the presence of an acidic condensing agent an alcoholic solution of products formed by the reaction of a bisthioammeline polyalkylene ether and formaldehyde.

11. The process which comprises heating an alcoholic solution of products formed by the reaction of a bisthioammeline polyalkylene ether and formaldehyde.

12. The process which comprises heating together at reacting temperatures an alcohol, a bisthioammeline polyalkylene ether, and an aldehyde and removing the water formed in the reaction.

13. The process which comprises heating together at reacting temperatures butanol, $\beta,\beta'$-bisthioammeline diethyl ether, and formaldehyde and removing the water formed in the reaction.

14. As new compositions of matter, the products formed by the chemical combination of a bisthioammeline polyalkylene ether and an aldehyde.

15. As new compositions of matter, the products formed by the chemical combination of a bisthioammeline polyalkylene ether, an aldehyde, and a lower aliphatic alcohol in the presence of an acidic condensing agent.

16. As new compositions of matter, the products formed by the chemical combination of a bisthioammeline polyalkylene ether and an aldehyde reacted in aqueous solution in the presence of an alkaline earth halide.

17. As new compositions of matter, the addition products of a bisthioammeline polyalkylene ether and formaldehyde.

18. As new compositions of matter, the products formed by the condensation of a bisthioammeline polyalkylene ether and formaldehyde.

19. As new compositions of matter, the products formed by the chemical reaction of one molecular equivalent of a bisthioammeline polyalkylene ether and more than six molecular equivalents of formaldehyde and having the excess formaldehyde over that reacted with the bisthioammeline polyalkylene ether chemically combined with another compound capable of forming a resinous condensate with formaldehyde.

20. As a new article of manufacture, an alcoholic solution of a reactive reaction product of a bisthioammeline polyalkylene ether and formaldehyde.

21. As new compositions of matter, the products obtainable by the chemical combination of formaldehyde and β,β'-bisthioammeline diethyl ether.

22. As new compositions of matter the products obtained by the chemical combination of formaldehyde, a bisthioammeline polyalkylene ether, and urea, in which the ratio of the bisthioammeline polyalkylene ether to urea is at least one to three.

HERMAN A. BRUSON.
JAMES L. RAINEY.